(12) United States Patent
Luo (10) Patent No.: US 12,008,167 B2
(45) Date of Patent: Jun. 11, 2024

(54) ACTION RECOGNITION METHOD AND DEVICE FOR TARGET OBJECT, AND ELECTRONIC APPARATUS

(71) Applicant: BEIJING BYTEDANCE NETWORK TECHNOLOGY CO., LTD., Beijing (CN)

(72) Inventor: Guozhong Luo, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 663 days.

(21) Appl. No.: 17/260,072

(22) PCT Filed: Feb. 26, 2020

(86) PCT No.: PCT/CN2020/076742
§ 371 (c)(1),
(2) Date: Jan. 13, 2021

(87) PCT Pub. No.: WO2020/220809
PCT Pub. Date: Nov. 5, 2020

(65) Prior Publication Data
US 2021/0281744 A1    Sep. 9, 2021

(30) Foreign Application Priority Data

Apr. 29, 2019  (CN) .......................... 201910353500.6

(51) Int. Cl.
*G06F 3/01* (2006.01)
*G06T 5/92* (2024.01)
(Continued)

(52) U.S. Cl.
CPC ................ *G06F 3/017* (2013.01); *G06T 5/92* (2024.01); *G06V 10/56* (2022.01); *G06V 20/46* (2022.01);
(Continued)

(58) Field of Classification Search
CPC ........ G06F 3/017; H04N 9/77; H04N 23/611; G06T 5/009; G06V 10/56; G06V 20/46;
(Continued)

(56) References Cited

U.S. PATENT DOCUMENTS

| | | | |
|---|---|---|---|
| 7,990,421 B2 * | 8/2011 | Thorn .................. | H04N 23/611 348/222.1 |
| 2015/0317037 A1 * | 11/2015 | Suzuki .................. | G06F 3/0425 345/175 |
| 2020/0387698 A1 * | 12/2020 | Yi .......................... | G06N 3/047 |

OTHER PUBLICATIONS

Notification of Grant dated Nov. 1, 2022 in Japanese Patent Application No. 2021-503605, with English translation (5 pages).
(Continued)

*Primary Examiner* — Ahmed A Berhan (57) ABSTRACT

An action recognition method and device for a target object, and an electronic apparatus is disclosed. The action recognition method for a target object comprises: obtaining an original image from an image source, the original image comprising a target object, recognizing the target object from the original image; detecting a plurality of key points of the target object; determining, on the basis of the detected key points, visibility attributes of the plurality of key points, wherein the visibility attributes are used to indicate whether or not the key points are occluded; and recognizing an action of the target object according to a combined values of the visibility attributes of the plurality of key points. The method uses visibility of key points to determine actions of a target object, thereby resolving the technical issue in the prior art in which complex actions cannot be accurately recognized.

10 Claims, 5 Drawing Sheets

(51) Int. Cl.
 *G06V 10/56* (2022.01)
 *G06V 20/40* (2022.01)
 *G06V 40/20* (2022.01)
 *H04N 9/77* (2006.01)
 *H04N 23/611* (2023.01)

(52) U.S. Cl.
 CPC .............. *G06V 40/20* (2022.01); *G06V 40/28* (2022.01); *H04N 9/77* (2013.01); *H04N 23/611* (2023.01)

(58) Field of Classification Search
 CPC ........ G06V 40/20; G06V 40/28; G06V 30/19; G06V 40/10
 See application file for complete search history.

(56) References Cited

OTHER PUBLICATIONS

International Search Report for International Application No. PCT/CN2020/076742, dated May 27, 2020, 5 pages.
Chinese Patent Application No. 201910353500.6, First Office Action, dated Nov. 20, 2019, 8 pages.
Chinese Patent Application No. 201910353500.6, Notice of Grant, dated May 20, 2020, 3 pages.

\* cited by examiner

ACTION RECOGNITION METHOD AND DEVICE FOR TARGET OBJECT, AND ELECTRONIC APPARATUS

The present application is a National Stage application of PCT international patent application PCT/CN2020/076742, filed on Feb. 26, 2020, which claims priority to Chinese Patent Application No. 201910353500.6, titled "ACTION RECOGNITION METHOD AND DEVICE FOR TARGET OBJECT, AND ELECTRONIC APPARATUS", filed on Apr. 29, 2019, both of which are incorporated herein by reference in their entireties.

FIELD

The present disclosure relates to the field of target recognition and image processing, and in particular to a method and a device for recognizing an action of a target object and an electronic apparatus.

BACKGROUND

With the development of the computer technologies, intelligent terminals are widely applied. For example, a user may listen to music, play games, chat on the internet and take photographs by using an intelligent terminal. The intelligent terminal may take a photograph having a resolution of ten millions of pixels, achieving a definition that is comparable to a professional camera.

At present, when taking a photograph using an intelligent terminal, a built-in photographing software may be used to achieve a conventional photographic effect.

Alternatively, an application (APP) downloaded through the network may be used to achieve an additional photographic effect or add a special effect to a video. In some occasions, an action of a user may be recognized before an effect is added.

In conventional technologies, a simple action of a target object may be determined based on change in a state of the target object among multiple frames, such as a position of a palm. However, some complex actions cannot be recognized in the above manner.

SUMMARY

The following technical solutions are provided according to an aspect of the present disclosure.

A method for recognizing an action of a target object is provided. The method includes: acquiring an original image from an image source, where the original image includes a target object, recognizing the target object from the original image, detecting multiple key points of the target object, determining visibility attributes of the multiple key points based on the detected key points, where a visibility attribute of a key point indicates whether the key point is covered; and recognizing an action of the target object based on a combined value of the visibility attributes of the multiple key points.

Further, after the recognizing an action of the target object based on a combined value of the visibility attributes of the multiple key points, the method further includes: determining whether the action of the target object is a first action, and performing, if the action of the target object is the first action, a first processing corresponding to the first action on the original image.

Further, the recognizing the target object from the original image includes: acquiring a current image frame of the original image, extracting image features from the image frame to form a feature image, generating multiple rectangular boxes in the feature image, determining, for each of the multiple rectangular boxes, the number of image features of the target object that are contained in the rectangular box; and outputting one of the multiple rectangle boxes that contains a maximum number of image features of the target object as a circumscribing box of the target object.

Further, the detecting multiple key points of the target object includes: inputting the recognized target object to a key point detecting model, and outputting, by using the key point detecting model, coordinates of each of the multiple key points on the original image.

Further, the determining visibility attributes of the multiple key points based on the detected key points where a visibility attribute of a key point indicates whether the key point is covered includes: inputting the target object of which multiple key points are detected to a visibility determining model, outputting, by using the visibility determining model, a visibility probability of each of the multiple key points, and comparing, for each of the multiple key points, the visibility probability of the key point with a first threshold and outputting a value for the visibility attribute of the key point.

Further, the recognizing an action of the target object based on a combined value of the visibility attributes of the multiple key points includes: acquiring a reference value for the combined value of the visibility attributes of the multiple key points, where the reference value corresponds to an action, comparing the combined value of the visibility attributes with the reference value, and outputting, if the combined value matches the reference value, the action corresponding to the reference value as the recognized action of the target object.

Further, the recognizing an action of the target object based on a combined value of the visibility attributes of the multiple key points includes: acquiring a variation reference value for combined values of the visibility attributes of the multiple key points, where the variation reference value for combined values corresponds to an action, acquiring two combined values of the visibility attributes of the multiple key points respectively in two consecutive image frames, calculating a variation value of the two combined values, comparing the variation value of the two combined values with the variation reference value for combined values, and outputting, if the variation value of the two combined values matches the variation reference value for combined values, the action corresponding to the variation reference value as the recognized action of the target object.

Further, the performing, if the action of the target object is the first action, a first processing corresponding to the first action on the original image includes: acquiring, if the action of the target object is the first action, the first processing corresponding to the first action and a parameter of the first processing, and performing the first processing on the original image based on the parameter of the first processing to obtain a processed image.

Further, the first processing is reducing image brightness. The parameter of the first processing is a percentage by which the image brightness is reduced. The performing the first processing on the original image based on the parameter of the first processing to obtain a processed image includes: acquiring, for each pixel of the original image, three color components of the pixel respectively in three channels in an RGB color space, and reducing, for each of the three color components of each pixel, the color component by the percentage to obtain processed three color components of the pixel.

The following technical solutions are further provided according to another aspect of the present disclosure.

A device for recognizing an action of a target object is provided. The device includes an original image acquiring module, a target object recognizing module, a key point detecting module, a visibility determining module and an action recognizing module.

The original image acquiring module is configured to acquire an original image from an image source. The original image includes a target object. The target object recognizing module is configured to recognize the target object from the original image. The key point detecting module is configured to detect multiple key points of the target object.

The visibility determining module is configured to determine visibility attributes of the multiple key points based on the detected key points. A visibility attribute of a key point indicates whether the key point is covered. The action recognizing module is configured to recognize an action of the target object based on a combined value of the visibility attributes of the multiple key points.

The device further includes a first action determining module and a first processing module. The first action determining module is configured to determine whether the action of the target object is a first action. The first processing module is configured to perform, if the action of the target object is the first action, a first processing corresponding to the first action on the original image.

The target object recognizing module further includes an image frame acquiring module, a feature extracting module, a rectangular box generating module, a number determining module and a circumscribed box outputting module. The image frame acquiring module is configured to acquire a current image frame of the original image. The feature extracting module is configured to extract image features from the image frame to form a feature image. The rectangular box generating module is configured to generate multiple rectangular boxes in the feature image. The number determining module is configured to determine, for each of the multiple rectangular boxes, the number of image features of the target object that are contained in the rectangular box. The circumscribing box outputting module is configured to output one of the multiple rectangle boxes that contains a maximum number of image features of the target object as a circumscribing box of the target object.

Further, the key point detecting module further includes a first inputting module and a first outputting module. The first inputting module is configured to input the recognized target object to a key point detecting model. The first outputting module is configured to output, by using the key point detecting model, coordinates of each of the multiple key points on the original image.

The visibility determining module further includes a second input module, a visibility probability determining module and a second output module. The second input module is configured to input the target object of which multiple key points are detected to a visibility determining model. The visibility probability determining module is configured to output, by using the visibility determining model, a visibility probability of each of the multiple key points. The second output module is configured to compare, for each of the multiple key points, the visibility probability of the key point with a first threshold and output a value for the visibility attribute of the key point.

The action recognizing module further includes a reference value acquiring module, a reference value comparing module and a first recognizing module. The reference value acquiring module is configured to acquire a reference value for the combined value of the visibility attributes of the multiple key points. The reference value corresponds to an action.

The reference value comparing module is configured to compare the combined value of the visibility attributes with the reference value. The first recognizing module is configured to output, if the combined value matches the reference value, the action corresponding to the reference value as the recognized action of the target object.

The action recognizing module further includes a variation reference value acquiring module, a combined value acquiring module, a variation value calculating module, a variation reference value comparing module and a second recognizing module. The variation reference value acquiring module is configured to acquire a variation reference value for combined values of the visibility attributes of the multiple key points. The variation reference value for combined values corresponds to an action. The combined value acquiring module is configured to acquire two combined values of the visibility attributes of the multiple key points respectively in two consecutive image frames. The variation value calculating module is configured to calculate a variation value of the two combined values. The variation reference value comparing module is configured to compare the variation value of the two combined values with the variation reference value for combined values. The second recognizing module is configured to output, if the variation value of the two combined values matches the variation reference value for combined values, the action corresponding to the variation reference value as the recognized action of the target object.

The first processing module further includes a first processing and parameter acquiring module and a first processing submodule. The first process and parameter acquiring module is configured to acquire, if the action of the target object is the first action, the first processing corresponding to the first action and a parameter of the first processing. The first processing submodule is configured to perform the first processing on the original image based on the parameter of the first processing to obtain a processed image.

Further, the first processing is reducing image brightness. The parameter of the first processing is a percentage by which the image brightness is reduced. The first processing submodule includes a color acquiring module and a brightness processing module. The color acquiring module is configured to acquire, for each pixel of the original image, three color components of the pixel respectively in three channels in an RGB color space. The brightness processing module is configured to reduce, for each of the three color components of each pixel, the color component by the percentage to obtain processed three color components of the pixel.

The following technical solution is further provided according to another aspect of the present disclosure.

An electronic apparatus is provided. The electronic apparatus includes a memory and a processor. The memory is configured to store non-transient computer readable instructions. The processor is configured to execute the computer readable instructions so as to perform steps in any one of the above methods for recognizing an action of a target object when executing the computer readable instructions.

The following technical solution is further provided according to another aspect of the present disclosure.

A computer readable storage media is provided. The computer readable storage media is configured to store non-transient computer readable instructions that when being executed by a computer, cause the computer to perform steps in any one of the above methods.

A method and a device for recognizing an action of a target object and an electronic apparatus are provided according to the present disclosure. The method for recognizing an action of a target object includes: acquiring an original image from an image source, where the original image includes a target object, recognizing the target object from the original image, detecting multiple key points of the target object, determining visibility attributes of the multiple key points based on the detected key points, where a visibility attribute of a key point indicates whether the key point is covered, and recognizing an action of the target object based on a combined value of the visibility attributes of the multiple key points. In the present disclosure, an action of the target object is determined based on visibilities of key points. In this way, a technical problem of inaccurate recognition of a complex action in the conventional technologies can be solved.

The above description is merely an overview of technical solutions of the present disclosure. In order to make technical means of the present disclosure more clear so as to be implemented according to the present disclosure, and make the above and other purposes, features and advantages better understood, preferred embodiments are described in detail below in conjunction with drawings.

DETAILED DESCRIPTION OF EMBODIMENTS

Embodiments of the present disclosure are described with specific examples hereinafter. Those skilled in the art may easily learn about other advantages and effects of the present disclosure from details disclosed in the present specification. Apparently, embodiments described below are merely some embodiments of the present disclosure rather than all embodiments of the present disclosure. The present disclosure may be implemented or applied in other different embodiments. Details of the present specification may be modified or changed based on different viewpoints and applications without departing from the spirit of the present disclosure. It should be noted that embodiments below and features in the embodiments may be combined with each other if there is no conflict. Any other embodiments obtained by those skilled in the art based on the embodiments in the present disclosure without any creative effort fall within the protection scope of the present disclosure.

It should be noted that, various aspects of embodiments in the scope of the attached claims are described below. Apparently, the various aspects described herein may be implemented in various forms, and any specific structures and/or functions described herein are only illustrative. According to the present disclosure, those skilled in the art should know that any aspects described herein may be implemented independently from other aspects or may be implemented in combination with one or more other aspects in various ways. For example, apparatuses and/or methods may be implemented by using any number of aspects of the present specification. In addition, other structures and/or functions than one or more aspects of the present disclosure may be used to implement the apparatus and/or method.

It should be noted that, the drawings provided in the following embodiments are merely used to schematically explain basic elements of the present disclosure. The drawings only show elements relating to the present disclosure and are not drawn according to actual number, shape and size of the elements. The shape, number and scale of each element in practical implementations may be changed optionally and the configuration of the elements may be more complex.

Moreover, in the following description, specific details are provided for better understanding of the embodiments. However, those skilled in the art should understand that the aspects of the present disclosure may be implemented without the specific details.

Figure 1:
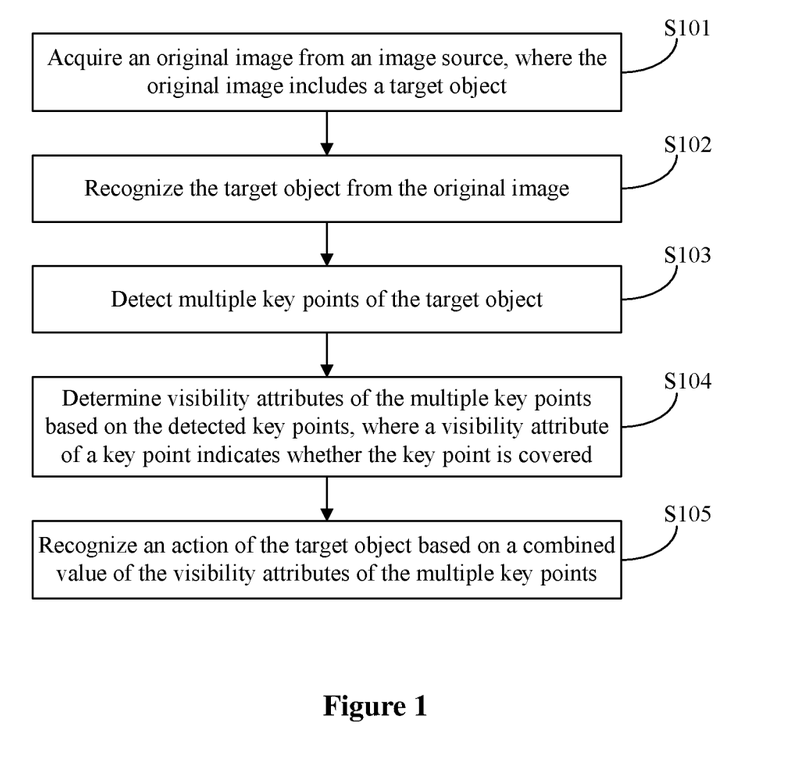
FIG. 1 is a flowchart of a method for recognizing an action of a target object according to an embodiment of the present disclosure.

A method for recognizing an action of a target object is provided according to an embodiment of the present disclosure. The method for recognizing an action of a target object according to the embodiment may be implemented by a computing device. The computing device may be implemented as software or a combination of software and hardware. The computing device may be integrated in a server, a terminal apparatus and the like. As shown in FIG. 1, the method for recognizing an action of a target object includes following steps S101 to S105.

In step S101, an original image is acquired from an image source. The original image includes a target object.

In the present disclosure, the image source may be a local storage or a network storage. The original image being acquired from the image source may be acquiring the original image from the local storage or the network storage. Whether the original image is acquired from the local storage or the network storage, a storage address of the original image is acquired first. Then the original image is acquired by using the storage address. The original image includes multiple image frames. The original image may be a video or a picture with a dynamic effect. Any image including multiple frames of images may serve as the original image according to the present disclosure.

In the present disclosure, the image source may be an image sensor. The acquiring the original image from the image source includes acquiring the original image from the image sensor. The image sensor refers to various apparatuses capable of capturing an image. A typical image sensor may be a video recorder, a camera and the like. In the embodiment, the image sensor may be a camera of a mobile terminal, such as a front camera or a back camera of an intelligent phone. The original image captured by the camera may be directly displayed on a display screen of the intelligent phone. The video captured by the image sensor in this step is used in a next step for recognizing a target object in the image.

In the present disclosure, the original image includes a target object. The target object may be one or more specific objects, such as hands, faces, human bodies, various animals and the like.

In a typical application, a user uses a camera of a mobile to capture an image of the user, and the captured image is displayed on a display device of the mobile terminal. In this case, the user may perform various actions in front of the camera, and the mobile terminal detects a hand gesture in the image captured by the camera. Recognition and detection performed on the target object are described in the following steps and are not described in this paragraph.

In step S102, the target object is recognized from the original image.

Figure 2:
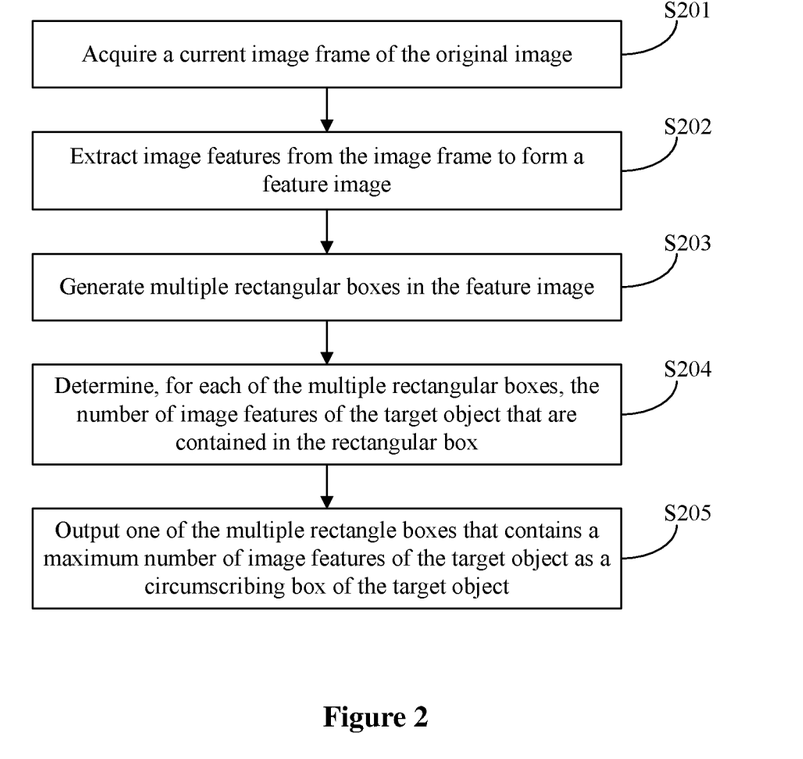
FIG. 2 is a flowchart showing further detail of step S102 in the method for recognizing an action of a target object according to an embodiment of the present disclosure.

As shown in FIG. 2, in the present disclosure, the recognizing the target object from the original image may include following steps S201 to S205.

In step S201, a current image frame of the original image is acquired.

In step S202, image features are extracted from the image frame to form a feature image.

In step S203, multiple rectangular boxes are generated in the feature image.

In step S204, for each of the multiple rectangular boxes, the number of image features of the target object that are contained in the rectangular box is determined.

In step S205, one of the multiple rectangle boxes that contains the maximum number of image features of the target object is outputted as a circumscribing box of the target object.

In step S201, the current image frame of the original image is acquired. The image frame is essentially an image. For example, in a common video, a video of one second may include 30 frames. That is, one image is acquired every 33 ms. The current image frame is an image of the video that is played at a current time instant.

In step S202, the image features are extracted from the image frame to form the feature image. The image features may be extracted by using convolution. Extraction and calculation are performed on the pixels by using a preset convolution kernel to form the feature image. For example, feature extraction may be performed on a 10*10 video frame with a step size of 1 by using a 3*3 convolution kernel to generate an 8*8 feature image. It can be understood that convolution may be performed on the image frame using a multilayer convolution kernel to form a small feature image or using multiple convolution kernels to generate different feature images. In addition, the above manners may be combined to generate multiple small feature images. The multiple small feature images are aggregated to generate one feature image. It can be understood that the feature image may be generate in any one or a combination of the above manners, which is not limited herein.

In step S203, multiple rectangular boxes are generated in the feature image to frame features of the target object. The feature image may be divided into multiple rectangular areas. Each rectangular area includes a central point. Multiple rectangular boxes that surround the central point and each of which have a predetermined size are generated, where central points of the rectangular boxes coincide with the central point of the rectangular area. In this way, multiple rectangle boxes surrounding the rectangular area or surrounded by the rectangular area are be generated.

In step S204, for each of the multiple rectangle boxes generated in step S203, the number of image features of the target object that are contained in the rectangle box is determined. The number may be represented by a confidence that the rectangle box contains the target object. A high confidence coefficient indicates that the rectangle box contain a large number of image features of the target object.

In step S205, one of the multiple rectangle boxes that contains the maximum number of image features of the target object is outputted as the circumscribing box of the target object. In step S204, there may be many rectangle boxes with similar confidences. In step S205, the rectangle boxes may be ranked according to the confidences. For example, rectangle boxes with confidences ranging from 1 to 0.5 are ranked in a descending order of confidences. A rectangle box with a confidence less than 0.5 is discarded. Degrees of overlap of the rectangular boxes are sequentially determined. Deduplication is performed on rectangular boxes with large degrees of overlap to obtain one rectangular box with the largest confidence coefficient, which is outputted as the circumscribing box of the target object.

It can be understood that the target object may be recognized in many manners, that may be further optimized for different target objects, which is not the core idea of the present disclosure and is not described herein. Any manner in which the target object can be recognized from the original image may be applied to the present disclosure.

In step S103, multiple key points of the target object are detected.

Figure 3:
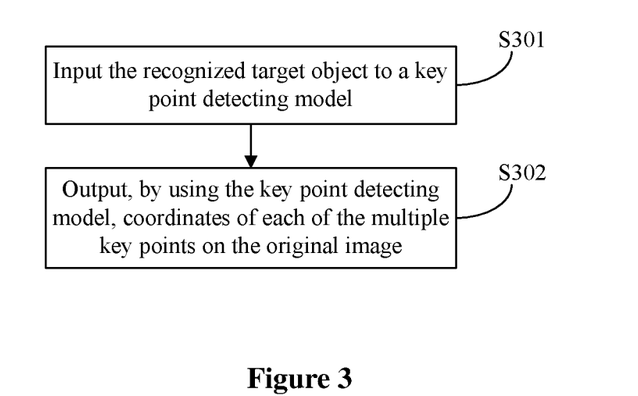
FIG. 3 is a flowchart showing further detail of step S103 in the method for recognizing an action of a target object according to an embodiment of the present disclosure.

As shown in FIG. 3, in the present disclosure, the detecting multiple key points of the target object may include the following steps S301 and S302.

In step S301, the recognized target object is inputted to a key point detecting model.

In step S302, coordinates of each of the multiple key points on the original image is outputted by the key point detecting model.

In the above steps, the key point detecting model is a pre-trained model for detecting key points. The key point detecting model is required to be trained using multiple images on which key points of a target object are marked as a training image set. Typically, the target object is a hand and there are 22 key points numbered from 0 to 21. In this case, the 22 key points of the hand are marked on the multiple images, and the images serve as a training image set and are inputted to the key point detecting model. Coordinates of the key points predicted by the key point detecting model are compared with coordinates of the key points marked on the training image set to obtain errors. The errors are fed back to the key point detecting model. The key point detecting model adjusts a model parameter based on the errors and predicts coordinates of the key points again based on the images in the training image set. The prediction and the adjustment are performed repeatedly until for each image in the training image set, coordinates of the key points predicted by the key point detecting model are the same as coordinates of key points marked on the image. The target object recognized in step S102 is inputted to the trained key point detecting model. Coordinates of each key point on the original image is outputted by the key point detecting model. In order to accelerate the detection, the inputted target object here may be the target object image in the circumscribing box in step S102. A speed of the recognition is fast due to a small size of the target object image in the circumscribing box. The size and the central point of the circumscribing box are known when the key point detecting model outputs the coordinates of the key points. Therefore, coordinates of the key points on the original image can be calculated based on a position and the size of the circumscribing box. A calculating method is not described herein.

In step S104, visibility attributes of the multiple key points are determined based on the detected key points. A visibility attribute of a key point indicates whether the key point is covered.

Figure 4:
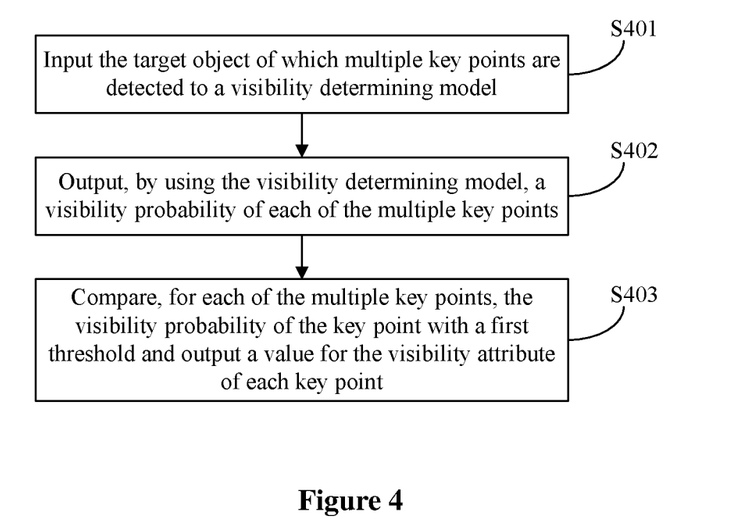
FIG. 4 is a flowchart showing further detail of step S104 in the method for recognizing an action of a target object according to an embodiment of the present disclosure.

As shown in FIG. 4, in the present disclosure, the determining visibility attributes of the multiple key points that are detected may include the following steps S401 to S403.

In step S401, the target object of which multiple key points are detected is inputted to a visibility determining model.

In step S402, a visibility probability of each of the multiple key points is outputted by the visibility determining model.

In step S403, the visibility probability of each of the multiple key points is compared with a first threshold and a visibility attribute of each of the multiple key points is outputted.

In the above steps, the visibility determining model is required. The visibility determining model is trained using a marking training set. The marking training set includes images of the target object at various angles and gestures, on which whether each key point of the target object is visible is marked, that is, whether each key point of the target object is covered is marked. The images in the marking training set are inputted to the visibility determining model. Outputs of the model are compared with marks on the images. The outputs of the model are probabilities each indicating whether a key point is visible. If the probability is greater than a threshold, it is determined that a visibility of the key point indicated by the probability is consistent with the mark of the key point on the image. If a visibility of a key point indicated by a probability is inconsistent with the mark of the key point on the image, a loss function is calculated and an error is fed back to the visibility determining model. A model parameter of the visibility determining model is adjusted based on the error. Then the training set is inputted to the visibility determining model again to obtain an outputted result. The model parameter is adjusted repeatedly until the outputs are consistent with the marks. In this way, training of the visibility determining model is completed.

When the visibility determining model is used in the above steps, the target object of which multiple key points are detected is inputted to the visibility determining model. Then a visibility probability of each of the multiple key points is outputted by the visibility determining model. The visibility probability is compared with the predetermined first threshold. The threshold may be equal to 0.8. That is, in a case that an outputted probability of a key point is greater than 0.8, it is determined that the key point is visible. In a case that an outputted probability of a key point is less than 0.8, it is determined that the key point is invisible. Then the probability is outputted through an activation function, where 1 is outputted for a visible key point, and 0 is outputted for an invisible key point. In this way, a vector of values of visibility attributes is obtained. The vector is a 1*N vector where N represents the number of the key points. A value of an element in the vector is equal to 0 or 1. 0 represents that a corresponding key point is invisible and 1 represents that a corresponding key point is visible.

In step S105, an action of the target object is recognized based on a combined value of the visibility attributes of the multiple key points.

Figure 5:
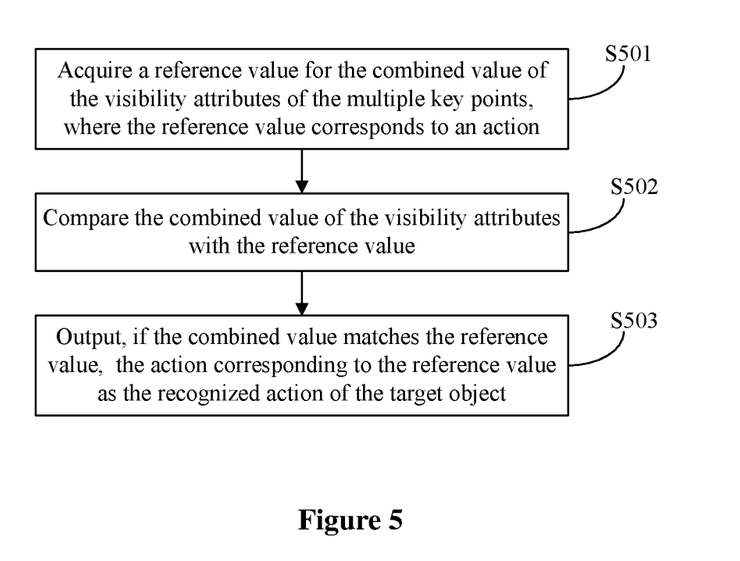
FIG. 5 is a flowchart showing further detail of step S105 in the method for recognizing an action of a target object according to an embodiment of the present disclosure.

As shown in FIG. 5, the recognizing the action of the target object based on a combined value of the visibility attributes of the multiple key points may include the following steps S501 to S503.

In step S501, a reference value for the combined value of the visibility attributes of the multiple key points is acquired. The reference value corresponds to an action.

In step S502, the combined value of the visibility attributes is compared with the reference value.

In step S503, if the combined value matches the reference value, the action corresponding to the reference value is outputted as the recognized action of the target object.

In the above steps, a static action of the target object, for example, a gesture may be determined. In a case that the target object is a hand, a gesture of the hand may be recognized.

In step S104, values of the visibility attributes may be outputted in a form of a combined value of the visibility attributes, that is, a vector. Reference values for the combined value of visibility attributes of one or more actions of the target object may be preset in a configuration file. The reference value may also be a vector, for example, a 1*N vector. After the combined value of the visibility attributes is obtained, the one or more reference values for the combined value of the visibility attributes are acquired from the configuration file. Then the combined value of visibility attributes is compared with each of the reference values. In the present disclosure, the comparison may be performed by calculating a similarity between two vectors. The similarity between two vectors may be calculated by using the Pearson correlation coefficient, the Euclidean distance, the cosine similarity, the Manhattan distance and the like. If a similarity is greater than a predetermined second threshold, it is determined that the combined value matches the reference value. The action corresponding to the reference value is outputted as a recognized action of the target object. In this way, the action of the target object is recognized.

Figure 6:
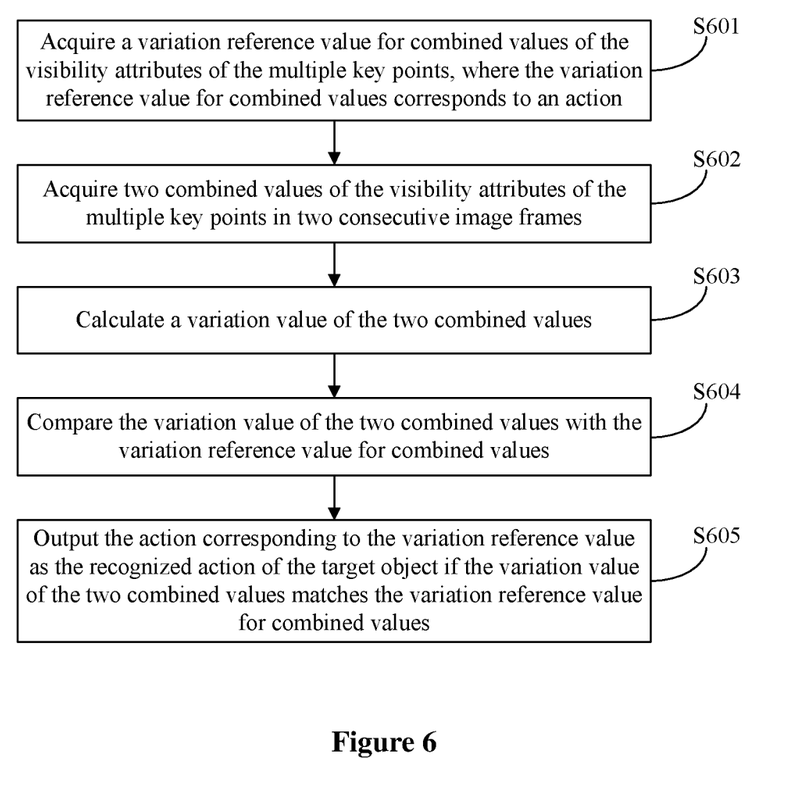
FIG. 6 is a flowchart showing further detail of step S105 in the method for recognizing an action of a target object according to an embodiment of the present disclosure.

As shown in FIG. 6, the recognizing the action of the target object based on the combined value of the visibility attributes of the multiple key points may further includes the following steps S601 to S605.

In step S601, a variation reference value for combined values of the visibility attributes of the multiple key points is acquired. The variation reference value for combined values corresponds to an action.

In step S602, two combined values of the visibility attributes of the multiple key points respectively in two consecutive image frames are acquired.

In step S603, a variation value of the two combined values is calculated.

In step S604, the variation value of the two combined values is compared with the variation reference value for combined values.

In step S605, if the variation value of the two combined values matches the variation reference value for combined values, the action corresponding to the variation reference value is outputted as the recognized action of the target object.

In the above steps, a dynamic action of the target object, for example, a changing action may be determined. In a case that the target object is a hand, a finger snap of the hand may be recognized. The finger snap can be recognized based on at least two states of the hand. In step S104, the values of the visibility attributes may be outputted in a form of the combined value of the visibility attributes, that is, a vector. One or more variation reference values for combined values of visibility attributes of actions of the target object may be preset in a configuration file. The variation reference value may be two vectors, for example, two 1*N vectors, each of which represents the reference value for combined values of visibility attributes of the target object in one of the two states. In the above steps, two combined values of visibility attributes of key points in two consecutive image frames are acquired and are combined to form a variation value. The variation value may be a new vector formed by combining the two combined values end-to-end, for example, a 1*2N vector may be formed by combining two 1*N vectors. In this case, the acquired variation reference value for combined values of visibility attributes may be a combined vector of two 1*N vectors. Then, a similarity between the variation value of the two combined values and the variation reference value for combined values is calculated to determine whether the variation value of the combined values matches the variation reference value of the combined values. A method for calculating the similarity is similar to that described above. If the similarity is greater than a predetermined third threshold, it is determined that the variation value of the combined values matches the variation reference value, and the action corresponding to the variation reference value is outputted as the recognized action of the target object. In this way, the action of the target object is recognized.

It can be understood that there are many methods for calculating a similarity between two vectors and the present disclosure is not limited to the above methods. In fact, a weight of each key point may be set when the similarity is calculated according to actual needs. A similarity between two vectors may be calculated using any other algorithms even using a strict match, which is not limited in the present disclosure and is not described herein.

After step S105, the method for recognizing an action of a target object may further include the following steps.

It is determined that whether the action of the target object is a first action.

If the action of the target object is the first action, a first processing corresponding to the first action is performed on the original image.

The first processing is reducing image brightness. A parameter of the first processing is a percentage by which the image brightness is reduced. The performing the first processing on the original image based on the parameter of the first processing to obtain a processed image includes the following steps.

For each pixel of the original image, three color components of the pixel respectively in three channels in an RGB color space are acquired.

For each of the three color components of each pixel, the color component is reduced by the percentage to obtain processed three color components of the pixel.

The above steps show an application of the method for recognizing an action of a target object according to the present disclosure. In the above steps, a recognized action of the target object triggers an image processing operation. A result of the image processing operation is a darkened image. The target object may be a hand and the action may be a finger snap. The first processing is reducing image brightness. The parameter of the first processing is equal to 50%. In a case of shooting a video using a camera of a mobile terminal, brightness of the video on a screen of the mobile terminal is reduced by 50% when the hand appears in the video and a finger snap of the hand is recognized, thereby achieving an effect similar to turning off a light by snapping fingers.

It can be understood that with the method for recognizing an action of a target object according to the present disclosure, any special effects can be triggered. The effect similar to turning off a light by snapping fingers is only an example. Solutions for triggering other effects are not described herein.

A method and a device for recognizing an action of a target object and an electronic apparatus are provided according to the present disclosure. The method for recognizing an action of a target object includes: acquiring an original image from an image source, where the original image includes a target object, recognizing the target object from the original image, detecting multiple key points of the target object, determining visibility attributes of the multiple key points based on the detected key points, where a visibility attribute of a key point indicates whether the key point is covered, and recognizing an action of the target object based on a combined value of the visibility attributes of the multiple key points. In the present disclosure, an action of the target object is determined based on visibilities of key points. In this way, a technical problem of inaccurate recognition of a complex action in the conventional technologies can be solved.

Although various steps in the method embodiments are described in the above order hereinbefore, those skilled in the art should understand that steps in the embodiments of the present disclosure are not necessary to be performed in the described order and also be performed in a reverse order, a parallel order, a crossover order or other orders. In addition, based on the above steps, those skilled in the art may also add other steps to the above steps. These distinct variations or equivalent substitutions also fall within the protection scope of the present disclosure, which is not described herein.

Device embodiments of the present disclosure are described below. The device embodiments of the present disclosure may be applied to implement steps in the method embodiments of the present disclosure. Only parts relevant to the device embodiments are described for illustration. For specific technical details not disclosed, one may refer to the method embodiments of the present disclosure.

Figure 7:
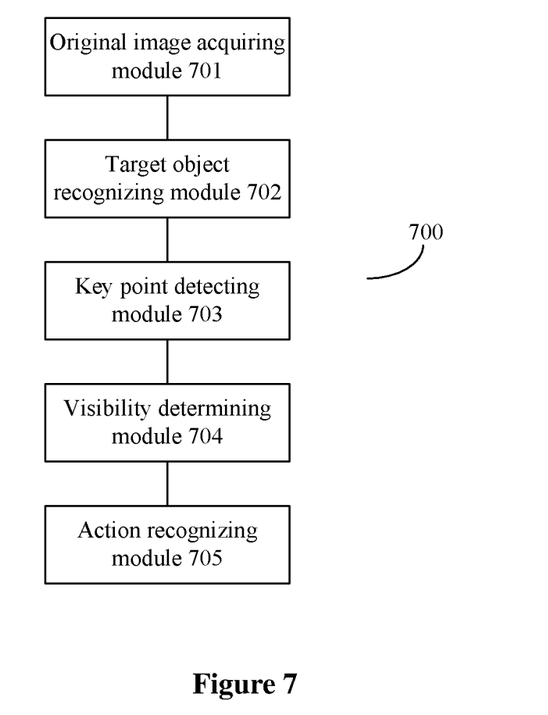
FIG. 7 is a schematic structural diagram of a device for recognizing an action of a target object according to an embodiment of the present disclosure.

An image processing device is provided according to the embodiments of the present disclosure. The device may perform steps in the embodiments of the method for recognizing an action of a target object. As shown in FIG. 7, a device 700 mainly includes an original image acquiring module 701, a target object recognizing module 702, a key point detecting module 703, a visibility determining module 704 and an action recognizing module 705.

The original image acquiring module 701 is configured to acquire an original image from an image source. The original image includes a target object.

The target object recognizing module 702 is configured to recognize the target object from the original image.

The key point detecting module 703 is configured to detect multiple key points of the target object.

The visibility determining module 704 is configured to determine visibility attributes of the multiple key points based on the detected key points. A visibility attribute of a key point indicates whether the key point is covered.

The action recognizing module 705 is configured to recognize an action of the target object based on a combined value of the visibility attributes of the multiple key points.

The device 700 further includes a first action determining module and a first processing module.

The first action determining module is configured to determine whether the action of the target object is a first action.

The first processing module is configured to perform, if the action of the target object is the first action, a first processing corresponding to the first action on the original image.

The target object recognizing module 702 further includes an image frame acquiring module, a feature extracting module, a rectangular box generating module, a number determining module and a circumscribing box outputting module.

The image frame acquiring module is configured to acquire a current image frame of the original image.

The feature extracting module is configured to extract image features from the image frame to form a feature image.

The rectangular box generating module is configured to generate multiple rectangular boxes in the feature image.

The number determining module is configured to determine, for each of the multiple rectangular boxes, the number of image features of the target object that are contained in the rectangular box.

The circumscribing box outputting module is configured to output one of the multiple rectangle boxes that contains a maximum number of image features of the target object as a circumscribing box of the target object.

The key point detecting module 703 further includes a first inputting module and a first outputting module.

The first inputting module is configured to input the recognized target object to a key point detecting model.

The first outputting module is configured to output coordinates of each of the multiple key points on the original image by using the key point detecting model.

The visibility determining module 704 further includes a second input module, a visibility probability determining module and a second output module.

The second input module is configured to input the target object of which multiple key points are detected to a visibility determining model.

The visibility probability determining module is configured to output a visibility probability of each of the multiple key points by using the visibility determining model.

The second output module is configured to compare, for each of the multiple key points, a visibility probability of the key point with a first threshold and output a value for the visibility attribute of the key point.

The action recognizing module 705 further includes a reference value acquiring module, a reference value comparing module and a first recognizing module.

The reference value acquiring module is configured to acquire a reference value for the combined value of the visibility attributes of the multiple key points. The reference value corresponds to an action.

The reference value comparing module is configured to compare the combined value of the visibility attributes with the reference value.

The first recognizing module is configured to output, if the combined value matches the reference value, the action corresponding to the reference value as the recognized action of the target object.

The action recognizing module 705 further includes a variation reference value acquiring module, a combined value acquiring module, a variation value calculating module, a variation reference value comparing module and a second recognizing module.

The variation reference value acquiring module is configured to acquire a variation reference value for combined values of the visibility attributes of the multiple key points. The variation reference value or combined values corresponds to an action.

The combined value acquiring module is configured to acquire two combined values of the visibility attributes of the multiple key points respectively in two consecutive image frames.

The variation value calculating module is configured to calculate a variation value of the two combined values.

The variation reference value comparing module is configured to compare the variation value of the two combined values with the variation reference value for combined values.

The second recognizing module is configured to output, if the variation value of the two combined values matches the variation reference value for combined values, the action corresponding to the variation reference value as the recognized action of the target object.

The first processing module further includes a first processing and parameter acquiring module and a first processing submodule.

The first processing and parameter acquiring module is configured to acquire, if the action of the target object is the first action, the first processing corresponding to the first action and a parameter of the first processing.

The first processing submodule is configured to perform the first processing on the original image based on the parameter of the first processing to obtain a processed image.

Further, the first processing is reducing image brightness. The parameter of the first processing is a percentage by which the image brightness is reduced. The first processing submodule includes a color acquiring module and a brightness processing module.

The color acquiring module is configured to acquire, for each pixel of the original image, three color components of the pixel respectively in three channels in an RGB color space.

The brightness processing module is configured to reduce, for each of the three color components of each pixel, the color component by the percentage to obtain processed three color components of the pixel.

The device shown in FIG. 7 may perform the methods shown in FIG. 1 to FIG. 6. For parts not described in detail in this embodiment, one may refer to relevant descriptions in the embodiments corresponding to FIGS. 1 6. For a performing process and a technical effect of the technical solution, one may refer to descriptions in the embodiments corresponding to FIGS. 1 to 6. The performing process and the technical effect are not repeated herein.

Figure 8:
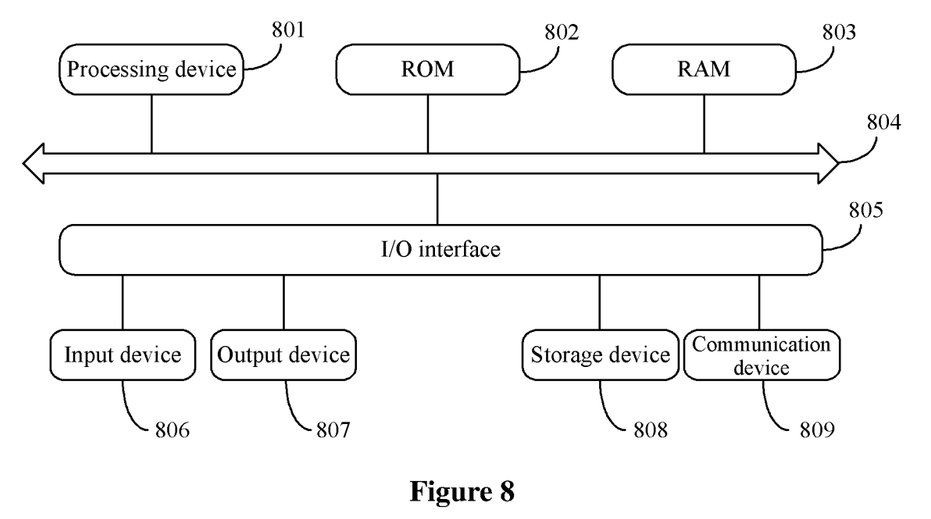
FIG. 8 is a schematic structural diagram of an electronic apparatus according to an embodiment of the present disclosure.

FIG. 8 is a schematic structural diagram of an electronic apparatus 800 applicable for implementing the embodiments of the present disclosure. The electronic apparatus according to the embodiment of the present disclosure may include but is not limited to a mobile terminal such as a mobile phone, a laptop computer, a digital broadcast receiver, a PDA (personal digital assistant), a PAD (tablet computer), a PMP (portable multimedia player) and a vehicle terminal (for example, a vehicle terminal), and a fixed terminal such as a digital TV and a desktop computer. The electronic apparatus shown in FIG. 8 is only an example and should not impose any limitations on the functions and the scope of use of the embodiments of the present disclosure.

As shown in FIG. 8, the electronic apparatus 800 may include a processing device (for example, a central processing unit, a graphics processing unit and the like) 801. The processing device 801 may perform various proper actions and processing based on a grogram stored in a read-only memory (ROM) 802 or a program loaded from a storage device 808 to a random-access memory (RAM) 803. The RAM 803 further stores various programs and data for an operation of the electronic apparatus 800. The processing device 801, the ROM 802 and the RAM 803 are connected to each other through a bus 804. An input/output (I/O) interface 805 is also connected to the bus 804.

Generally, the following may be connected to the I/O interface 805: an input device 806 such as a touch screen, a touch pad, a keyboard, a mouse, an image sensor, a microphone, an accelerometer, a gyroscope, an output device 807 such as a liquid crystal display (LCD), a speaker, a vibrator, a storage device 808 such as a magnetic tape, a hard disk, and a communication device 809. Based on the communication device 809, the electronic device 800 may communicate with other devices through wired or wireless communication to exchange data. Although FIG. 8 shows the electronic apparatus 800 including various devices, it should be understood that not all shown devices are required to be implemented or included. The shown devices may be replaced by other devices, or more or less devices may be included.

According to the embodiments of the present disclosure, the process described above in conjunction with the flowchart may be implemented as a computer software program. For example, the embodiments of the present disclosure include a computer program product. The computer program product includes a computer program stored in a computer readable medium. The computer program includes program codes for performing the method shown in the flowchart. In such embodiments, the computer program may be downloaded and installed from the network through the communication device 809, installed from the storage device 808, or installed from the ROM 802. The computer program, when being executed by the processing device 801, performs functions defined in the method according to the embodiments of the present disclosure.

It should be noted that the computer readable medium according to the embodiments of the present disclosure may be a computer readable signal medium, a computer readable storage medium or any combination of the computer readable signal medium and the computer readable storage medium. For example, the computer readable storage medium may be, but is not limited to, an electronic, magnetic, optical, electromagnetic, infrared, or semiconductor system, apparatus, or device, or any combination of the above. In addition, the computer readable storage medium may also include but is not limited to: electrical connections having at least one wire, a portable computer disk, a hard disk, a random access memory (RAM), a read only memory (ROM), erasable programmable read-only memory (EPROM or a flash memory), an optical fiber, a portable compact disc read-only memory (CD-ROM), a light storage device, a magnetic storage device, or any suitable combination of the above. In the present disclosure, the computer readable storage medium may be any physical medium including or storing a program. The program may be used by an instruction execution system, an instruction execution apparatus or an instruction execution device or may be used in combination with the instruction execution system, the instruction execution apparatus and the instruction execution device. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable medium can send, transmit or transfer programs used by an instruction execution system, an instruction execution apparatus and an instruction execution device or used in combination with the instruction execution system, the instruction execution apparatus and the instruction execution device. The program codes included in the computer readable medium may be transferred through any proper medium including, but not limited to, wireless, an electric wire, an optical cable, RF and any proper combination of the above.

The computer readable medium may be included in the electronic apparatus. Alternatively, the computer readable medium may exist independently and not assembled in the electronic apparatus.

The computer readable medium may carry one or more programs. The electronic apparatus, when executing the one or more programs, acquires an original image from the image source where the original image includes a target object, recognizes the target object from the original image, detects multiple key points of the target object, determines visibility attributes of the multiple key points based on the detected key points where a visibility attribute of a key point is used to represent whether the key point is covered, and recognizes an action of the target object based on a combined value of the visibility attributes of the multiple key points.

The computer program codes for performing the operations according to the present disclosure may be written in at least one programming language or a combination of the at least one programming language. The programming language includes an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some substitution implementations, a function indicated in the block may also occur in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a special hardware-based system for performing a specified function or operation or implemented by a combination of a special hardware and a computer instruction.

Units described in the embodiments of the present disclosure may be implemented through software or hardware. Names of the units do not limit the units in some cases.

The above descriptions are only preferred embodiments of the present disclosure and explanations of the technical principles of the present disclosure. Those skilled in the art should understand that the scope of the present disclosure is not limited to a technical solution formed by combining the above technical features in a specific manner and should cover other technical solutions formed by combining the above technical features or equivalent features of the above technical features in an arbitrary manner without departing from the conception of the present disclosure. For example, the scope of the present disclosure covers a technical solution formed by replacing one of the above features by a technical feature with a similar function disclosed in (but not limited to) the present disclosure.

The invention claimed is:

1. A method for recognizing an action of a target object, comprising:
    acquiring an original image from an image source, wherein the original image comprises a target object;
    recognizing the target object from the original image;
    detecting a plurality of key points of the target object;
    determining visibility attributes of the plurality of key points based on the detected key points, wherein a visibility attribute of a key point indicates whether the key point is covered; and
    recognizing an action of the target object based on a combined value of the visibility attributes of the plurality of key points,
    wherein the recognizing the target object from the original image comprises:
    acquiring a current image frame of the original image;
    extracting image features from the image frame to form a feature image;
    generating a plurality of rectangular boxes in the feature image;
    determining, for each of the plurality of rectangular boxes, the number of image features of the target object that are contained in the rectangular box; and
    outputting one of the plurality of rectangle boxes that contains a maximum number of image features of the target object as a circumscribing box of the target object.

2. The method for recognizing an action of a target object according to claim 1, wherein after the recognizing an action of the target object based on a combined value of the visibility attributes of the plurality of key points, the method further comprises:
    determining whether the action of the target object is a first action; and
    performing, if the action of the target object is the first action, a first processing corresponding to the first action on the original image.

3. The method for recognizing an action of a target object according to claim 2, wherein the performing, if the action of the target object is the first action, a first processing corresponding to the first action on the original image comprises:
    acquiring, if the action of the target object is the first action, the first processing corresponding to the first action and a parameter of the first processing; and
    performing the first processing on the original image based on the parameter of the first processing to obtain a processed image.

4. The method for recognizing an action of a target object according to claim 3, wherein
    the first processing is reducing image brightness;
    the parameter of the first processing is a percentage by which the image brightness is reduced; and
    the performing the first processing on the original image based on the parameter of the first processing to obtain a processed image comprises:
    acquiring, for each pixel of the original image, three color components of the pixel respectively in three channels in an RGB color space; and
    reducing, for each of the three color components of each pixel, the color component by the percentage to obtain processed three color components of the pixel.

5. The method for recognizing an action of a target object according to claim 1, wherein the detecting a plurality of key points of the target object comprises:
    inputting the recognized target object to a key point detecting model; and
    outputting, by using the key point detecting model, coordinates of each of the plurality of key points on the original image.

6. The method for recognizing an action of a target object according to claim 1, wherein the determining visibility attributes of the plurality of key points based on the detected key points, wherein a visibility attribute of a key point indicates whether the key point is covered, comprises:
    inputting the target object of which a plurality of key points are detected to a visibility determining model;
    outputting, by using the visibility determining model, a visibility probability of each of the plurality of key points; and
    comparing, for each of the plurality of key points, the visibility probability of the key point with a first threshold and outputting a value for the visibility attribute of the key point.

7. The method for recognizing an action of a target object according to claim 1, wherein the recognizing an action of the target object based on a combined value of the visibility attributes of the plurality of key points comprises:
    acquiring a reference value for the combined value of the visibility attributes of the plurality of key points, wherein the reference value corresponds to an action;
    comparing the combined value of the visibility attributes with the reference value; and
    outputting, if the combined value matches the reference value, the action corresponding to the reference value as the recognized action of the target object.

8. The method for recognizing an action of a target object according to claim 1, wherein the recognizing an action of the target object based on a combined value of the visibility attributes of the plurality of key points comprises:
    acquiring a variation reference value for combined values of the visibility attributes of the plurality of key points, wherein the variation reference value for combined values corresponds to an action;

acquiring two combined values of the visibility attributes of the plurality of key points respectively in two consecutive image frames;

calculating a variation value of the combined values;

comparing the variation value of the two combined values with the variation reference value for combined values; and outputting, if the variation value of the two combined values matches the variation reference value for combined values, the action corresponding to the variation reference value as the recognized action of the target object.

9. A device for recognizing an action of a target object, comprising:

a memory configured to store computer readable instructions; and a processor configured to execute the computer readable instructions causing the device to:

acquire an original image from an image source, wherein the original image comprises a target object;

recognize the target object from the original image;

detect a plurality of key points of the target object;

determine visibility attributes of the plurality of key points based on the detected key points wherein a visibility attribute of a key point indicates whether the key point is covered; and recognize an action of the target object based on a combined value of the visibility attributes of the plurality of key points, wherein the recognizing the target object from the original image comprises:

acquiring a current image frame of the original image;

extracting image features from the image frame to form a feature image;

generating a plurality of rectangular boxes in the feature image;

determining, for each of the plurality of rectangular boxes, the number of image features of the target object that are contained in the rectangular box; and outputting one of the plurality of rectangle boxes that contains a maximum number of image features of the target object as a circumscribing box of the target object.

10. A non-transient computer readable storage media configured to store computer readable instructions that when being executed by a computer, cause the computer to perform the operations of:

acquiring an original image from an image source, wherein the original image comprises a target object;

recognizing the target object from the original image;

detecting a plurality of key points of the target object;

determining visibility attributes of the plurality of key points based on the detected key points, wherein a visibility attribute of a key point indicates whether the key point is covered; and recognizing an action of the target object based on a combined value of the visibility attributes of the plurality of key points, wherein the recognizing the target object from the original image comprises:

acquiring a current image frame of the original image;

extracting image features from the image frame to form a feature image;

generating a plurality of rectangular boxes in the feature image;

determining, for each of the plurality of rectangular boxes, the number of image features of the target object that are contained in the rectangular box; and outputting one of the plurality of rectangle boxes that contains a maximum number of image features of the target object as a circumscribing box of the target object.

* * * * *